United States Patent
Shirai et al.

(10) Patent No.: US 6,481,879 B1
(45) Date of Patent: *Nov. 19, 2002

(54) HEAD LAMP FOR AUTOMOTIVE VEHICLE WITH MOVABLE REFLECTOR

(75) Inventors: Katutada Shirai, Shizuoka (JP); Kihachiro Uchida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 09/693,932

(22) Filed: Oct. 23, 2000

(30) Foreign Application Priority Data

Oct. 21, 1999 (JP) .......................................... 11-299296

(51) Int. Cl.$^7$ ................................................. F21V 7/00
(52) U.S. Cl. ...................... 362/514; 362/421; 362/428; 362/289; 362/530
(58) Field of Search ................................ 362/514, 289, 362/528, 529, 530, 418, 419, 420, 421, 428, 524

(56) References Cited

U.S. PATENT DOCUMENTS

| | | | |
|---|---|---|---|
| 5,508,896 A | 4/1996 | Suehiro et al. | 362/66 |
| 5,647,659 A | 7/1997 | Mori | 362/66 |
| 5,673,993 A | 10/1997 | Fukui | 362/66 |
| 5,678,915 A | 10/1997 | Shirai et al. | 362/61 |
| 6,017,137 A | * 1/2000 | Suehiro et al. | 362/289 |
| 6,315,438 B1 | * 11/2001 | Shirai et al. | 362/507 |

FOREIGN PATENT DOCUMENTS

| | | | | |
|---|---|---|---|---|
| GB | 2 341 229 A | 3/2000 | | B60Q/1/068 |
| JP | 5-48107 | 6/1993 | | F21M/3/20 |
| JP | 5-151801 | 6/1993 | | F21M/3/20 |
| JP | 7-27004 | 5/1995 | | F21M/3/20 |
| JP | 9-161506 | 6/1997 | | F21M/3/20 |
| JP | 11-1143 | 1/1999 | | B60Q/1/06 |
| JP | 11/59262 | 3/1999 | | B60Q/1/06 |

OTHER PUBLICATIONS

Patent Abstract of Japan 05–151801 Jun. 18, 1993.
Patent Abstract of Japan 09/161506 Jun. 20, 1997.
Patent Abstract of Japan 11–001143, Jan. 6, 1999.
Patent Abstract of Japan 11–059262, Mar. 2, 1999.

* cited by examiner

*Primary Examiner*—Sandra O'Shea
*Assistant Examiner*—Ali Alavi
(74) *Attorney, Agent, or Firm*—Sughrue Mion, PLLC

(57) ABSTRACT

A head lamp with a movable reflector. The headlamp includes a lamp body, a reflector with a light source mounted thereon, and an aiming mechanism interposed between the lamp body and the reflector (14) for tiltably supporting the reflector (14) with respect to the lamp body. The reflector tilts by the rotational movement of the aiming screw which is rotatably supported in a screw insertion hole formed on the lamp body. The screw insertion hole is formed by a tubular portion, and the front portion of the tubular portion includes divided swinging strips (53) which are resiliently deformable in the radial direction. The swinging strips engage with an engaging groove formed on the aiming screw to prevent the aiming screw from being detached from the lamp body. The aiming screw includes a rotatably supported portion formed of resin, a male screw portion, and a gear portion behind the rotatably supported portion. Further, the rotatably supported portion is unitarily formed with a skirt type resilient watertight rib (34b) in pressurized contact, and sliding contact, with the end surface of the backward extension of the tubular portion to ensure the resilient support of the aiming screw in the forward and backward direction and to ensure watertightness at the rotatably supported portion.

7 Claims, 9 Drawing Sheets

HEAD LAMP FOR AUTOMOTIVE VEHICLE WITH MOVABLE REFLECTOR

BACKGROUND OF THE INVENTION

1. Field of the Invention

The present invention relates to a head lamp for an automotive vehicle with a movable reflector in which a reflector having a light source mounted thereon is tiltably supported with respect to the lamp body by way of an aiming mechanism. Further, more specifically, the present invention relates to a head lamp for an automotive vehicle wherein an aiming mechanism includes an aiming screw having a rotatably supported portion which rotatably supports the aiming screw in a screw insertion hole formed in a body of the head lamp.

2. Related Art

Conventionally, as shown in FIG. 12, a head lamp for an automotive vehicle includes a reflector 2 having a light source integrally mounted thereon, the reflector 2 being supported on a front side of a lamp body 1 by a ball joint as a fulcrum of tilting movement. Further, the conventional head lamp includes an aiming mechanism having two nut members, as movable fulcrums, respectively engaged with two aiming screws so as to move the reflector forward and backward in the axial direction.

In other words, an aiming screw 4 is rotatably supported in a screw insertion hole 1a formed on the lamp body 1, and a nut member 5 mounted to the reflector 2 is engaged with a threaded portion 4a of the aiming screw 4. Rotation of the aiming screw 4 moves the nut member 5 forward and backward along the axis of the aiming screw 4 so that the reflector 2 tilts about a tilting axis extending between the ball joint and the nut member engaged with the other aiming screw, whereby the optical axis of the lamp can be adjusted.

The aiming screw 4 is made of metal and is provided with a cap gear 7 integrally formed at the rear end thereof, so that the aiming screw 4 can be rotated by a driver D. The aiming screw 4 is inserted into the screw insertion hole 1a from the back of the lamp body 1, and is resiliently supported and axially fixed by a push-on-fixture 8.

An O-ring 9, used as a sealing member, is fitted in the screw insertion hole 1a and engages the aiming screw 4 so as to make the connection, between the aiming screw 4 and the screw insertion hole 1a, watertight.

However, in the related art, the O-ring 9 for establishing watertightness between the aiming screw 4 and the insertion hole 1a, and the push-on-fixture 8 for axially fixing the aiming screw 4 in the forward and backward directions, make assembly of the aiming mechanism troublesome. Further, the conventional aiming mechanism is complex, and includes a relatively large number of components.

Since the O-ring is generally made of rubber, and tends to deteriorate when exposed to water for a long time, the conventional design is disadvantageous in that watertightness, at the portion between the aiming screw 4 and the insertion hole 1a, is degraded with years of use.

SUMMARY OF THE INVENTION

In light of the above-described problems of the related art, it is an object of the present invention to provide a head lamp for an automotive vehicle with a movable reflector in which watertightness, between the aiming screw and the screw insertion hole, is ensured without using an O-ring or other similar rubber members.

In order to achieve the above and other objects and advantages, a head lamp for an automotive vehicle with a movable reflector according to a first aspect of the present invention includes:

a container-shaped lamp body having a screw insertion hole, wherein the screw insertion hole includes a tubular portion formed integrally with the lamp body, wherein the tubular portion passes through and extends forward of the lamp body, and further wherein the tubular portion is constructed in such a manner that the portion extending forward is divided into a plurality of swinging strips each of which is resiliently deformable in the radial direction of the tubular portion, each of the swinging strips including a hooking portion formed on a forward portion thereof;

a reflector with a light source mounted thereon; and an aiming mechanism interposed between the lamp body and the reflector for supporting the reflector so that the reflector is tiltable with respect to the lamp body, the aiming mechanism including an aiming screw rotatably supported in the screw insertion hole, the aiming screw including a recessed engaging portion, the recessed engaging portion being engaged with the hooking portions of the swinging strips to thereby retain the aiming screw in the screw insertion hole, wherein the reflector is tilted by rotation of the aiming screw, wherein the aiming screw further includes:

a rotatably supported portion supported by the screw insertion hole, the rotatably supported portion including a forward portion and a rearward portion, wherein the rotatably supported portion is formed of synthetic resin, a male screw portion formed on the forward portion of the rotatably supported portion, a gear portion, formed on the rearward portion of the rotatably supported portion, to which rotational operating power is transmitted, wherein the rotatably supported portion, the male screw portion, and the gear portion are unitarily formed with each other, and a first skirt-type resilient watertight rib in pressurized-contact, and sliding-contact, with the periphery of the screw insertion hole.

When the aiming screw is inserted into the screw insertion hole from outside of the lamp body, the divided swinging strips, constituting the end of the forward extending tubular portion, are pressed by the rotatably supported portion so that they are resiliently deformed radially outwardly. The rotatably supported portion thus penetrates the tubular portion, and the hooking portion of the divided swinging strips then engages with the recessed engaging portion on the aiming screw. Further, the skirt type resilient rib comes in contact with a peripheral portion of the screw insertion hole, so that the aiming screw is axially fixed with respect to the screw insertion hole.

The skirt type resilient rib is brought into pressurized contact and sliding contact with the screw insertion hole to prevent water from coming between the peripheral portion of the screw insertion hole on the rear side of the lamp body and the rotatably supported portion of the aiming screw. Further, the skirt type resilient rib resiliently supports the aiming screw in the forward and backward directions.

Since both the watertight rib and the lamp body are formed of synthetic resin, sliding movement therebetween is ensured, whereby contact therebetween does not prevent rotation of the aiming screw. Further, the watertight rib is formed of synthetic resin and, therefore, better resists deterioration by water than does the rubber O-ring.

The second aspect of the present invention is a head lamp for an automotive vehicle with a movable reflector as is set forth in the first aspect of the invention, and which is further characterized in that the tubular portion penetrates the lamp body in the forward and backward directions, and extends from the lamp body in the forward and backward directions, the gear portion is composed of a cap gear having teeth at a front portion thereof, and the watertight rib comes into pressurized-contact, and sliding contact, with the backward extension of the tubular portion.

Because the screw insertion hole is long, extending in both the forward and backward directions, the aiming screw may be held without rattle and watertightness is improved.

The tip portion of a driver, disposed along the lamp body for rotating the aiming screw, comes into contact with the backward extension of the tubular portion so that the teeth of the driver engage with the teeth of the gear portion. In other words, the backward extension of the tubular portion serves as a guide member for maintaining the teeth of the driver in engagement with the teeth of the gear portion.

The third aspect of the present invention is a head lamp for an automotive vehicle with a movable reflector as is set forth in either the first or second aspect, and which is further characterized in that a second resilient watertight rib having a ring shape is formed integrally with the rotatably supported portion of the aiming screw. The second resilient watertight rib is in sliding contact with the inner surface of said screw insertion hole.

The second ring-shaped resilient watertight rib is maintained in pressurized-contact with the inner peripheral surface of the screw insertion hole to ensure watertightness between the rotatably supported portion of the aiming screw and the screw insertion hole.

Since the second resilient watertight rib is made of synthetic resin and is resilient and flexible, when the rotatably supported portion of the aiming screw is inserted into the screw insertion hole, the second watertight rib becomes resiliently deformed. Because the second resilient watertight rib resiliently deforms, it does not interfere with the assembly of the aiming screw, and does not interfere with the rotational movement of the aiming screw.

Because the second watertight rib is made of synthetic resin, it is better resistant to deterioration by water than is the rubber O-ring.

The fourth aspect of the present invention is a head lamp for an automotive vehicle with a movable reflector as is set forth any of the first to the third aspects, and is further characterized in that a portion of the aiming screw, from the rotatably supported portion to the rearward portion including the gear portion, is formed of synthetic resin, and the aiming screw further includes a metallic screw body on which the male screw portion is formed, wherein the rotatably supported portion is integrally molded to the metallic screw body.

Because the area of the male screw portion supporting the reflector in a cantilever manner is constituted of a metal screw body, the aiming screw can resist deformation. Further, because the area other than the screw body is formed of synthetic resin, the weight of the aiming screw is reduced.

In the fifth aspect of the invention, a head lamp for an automotive vehicle with a movable reflector is as set forth in any one of the first to third aspects, and is further characterized in that the aiming screw includes a gear integrated screw body of metal, the gear integrated screw body having a rear end and a front end, wherein the gear portion is unitarily formed on the gear-integrated-screw-body rear end, and the male screw portion is unitarily formed on the gear-integratedscrew-body front end, and further wherein the rotatably supported portion of synthetic resin is integrally molded to the gear integrated screw body.

In the fifth aspect of the present invention, the area for supporting the reflector in a cantilever manner, and a gear portion susceptible to damage by engaging with the teeth of the driver, are formed integrally as a metallic screw body. With such a construction, the shaft portion of the aiming screw is resistant to deformation, and the teeth of the gear are resistant to wear and damage.

In the sixth aspect of the present invention, a head lamp for an automotive vehicle with a movable reflector is as set forth in any one of the first to third aspects of the invention, and is further characterized in that the entire aiming screw—including the male screw portion, the rotatably supported portion, and the gear portion—monolithically formed of synthetic resin.

Because the entire aiming screw is formed of synthetic resin, it is light-weight.

In the seventh aspect of the present invention, a head lamp for an automotive vehicle with a movable reflector is as set forth in any one of the first to the third aspects, and is further characterized in that the rotatably supported portion includes a gear mounting portion projecting from and integrally formed on the rotatably-supported-portion rearward portion, the gear mounting portion including a peg-in-recess mounting mechanism, and the gear portion is mounted to the gear mounting portion by engaging the peg-in-recess so as to constitute a single unit.

According to the seventh aspect of the present invention, it is possible first to mount the aiming screw into the screw insertion hole, and then to mount a gear portion to the aiming screw so that they form a single unit, thereby facilitating assembly of the headlamp. Alternatively, according to this aspect of the present invention, it is possible to mount the gear portion to the rotatably supported portion first, so that they form a single unit, and then to attach such unit to the screw insertion hole.

BRIEF DESCRIPTION OF THE DRAWINGS

The above and other objects and advantages of the present invention will become more apparent by describing in detail preferred embodiments thereof with reference to the accompanying drawings, wherein like reference numerals designate like or corresponding parts throughout the several views, and wherein.

DETAILED DESCRIPTION OF THE INVENTION

Figure 1:
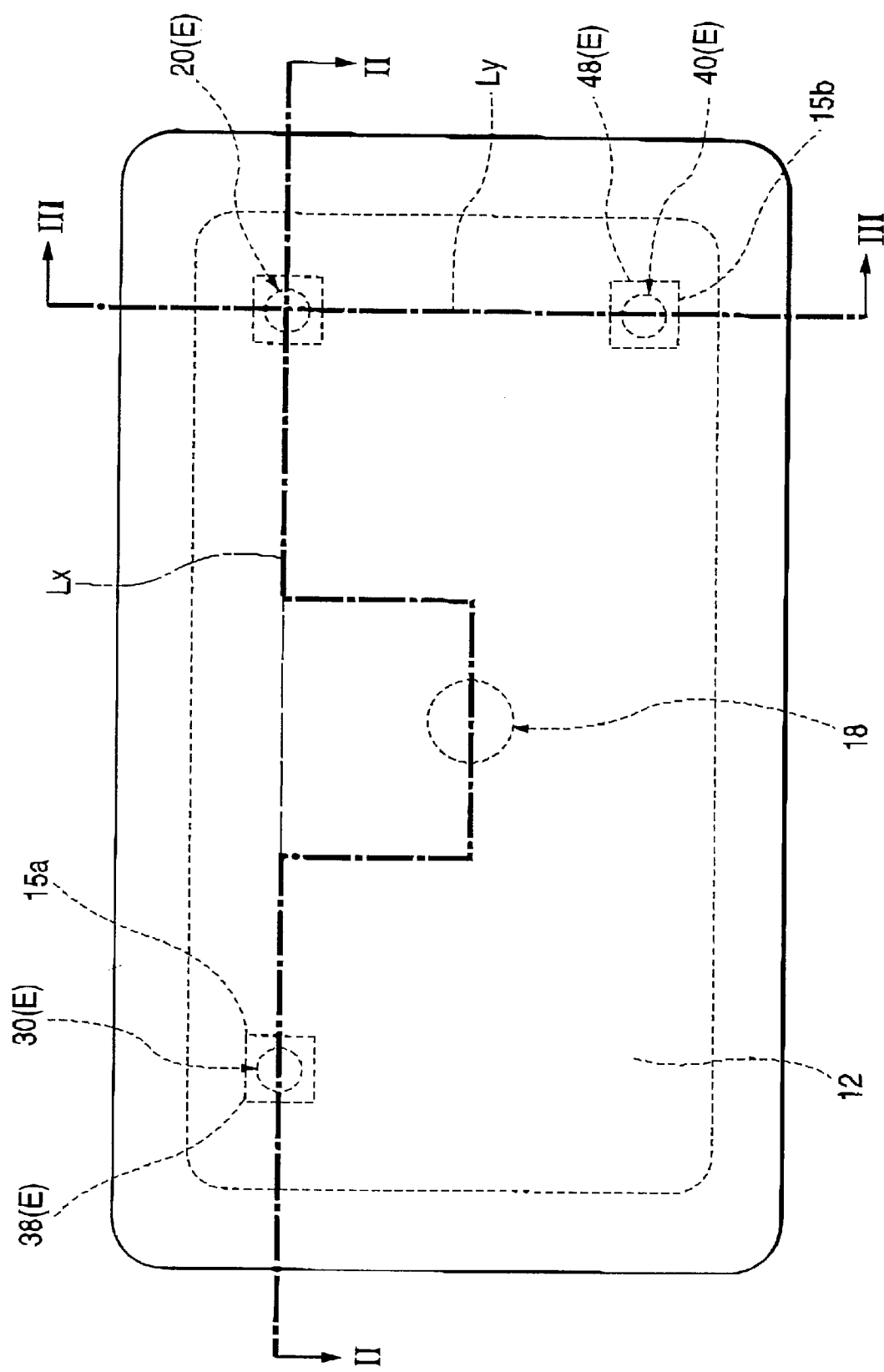
FIG. 1 is a front view of a head lamp, for an automotive vehicle, according to the first embodiment of the present invention.

Referring now to the drawings, embodiments of the present invention will be described.

Figure 2:
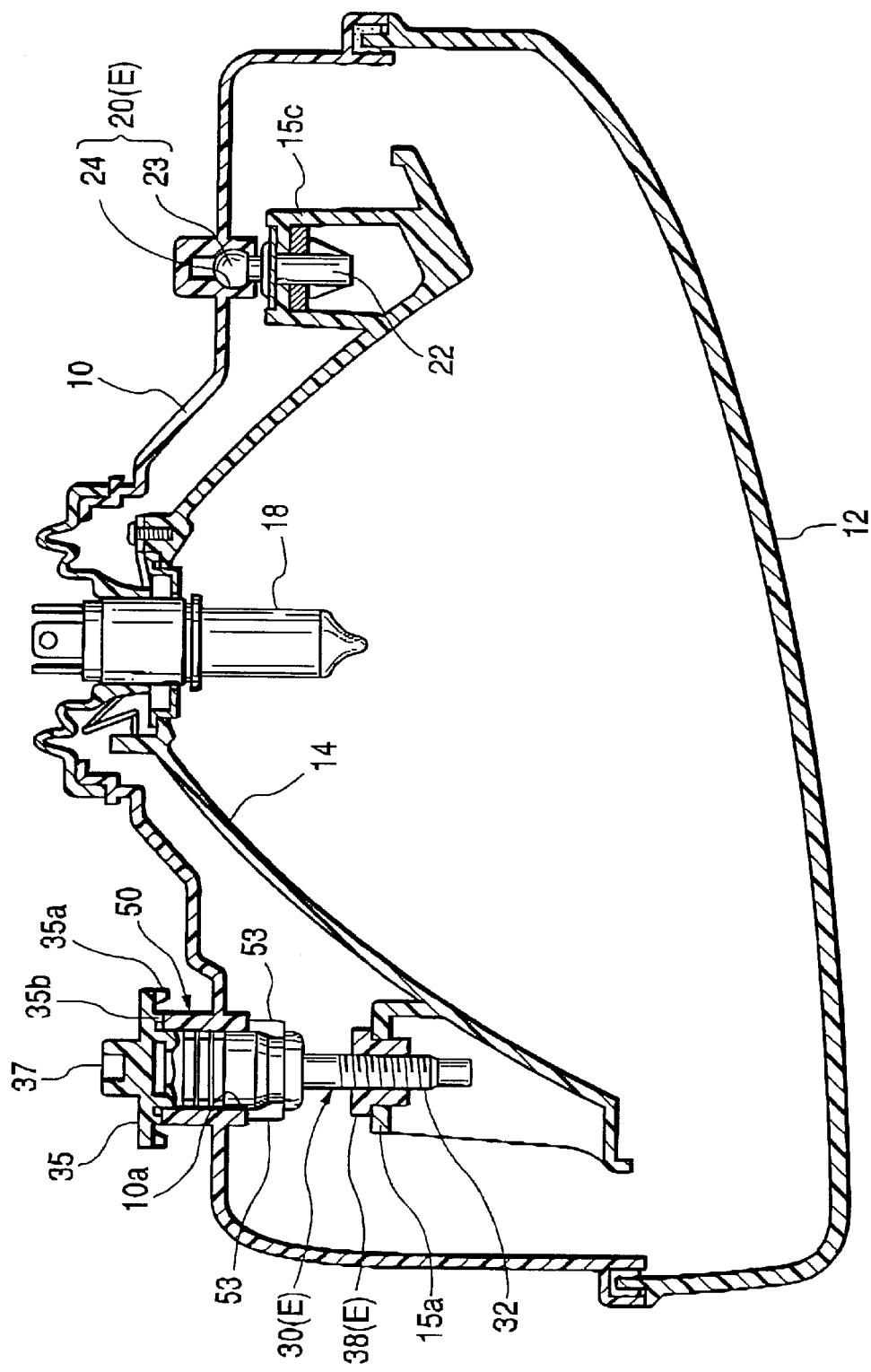
FIG. 2 is a horizontal cross section of the head lamp shown in FIG. 1, and is taken along the line II—II.
Figure 3:
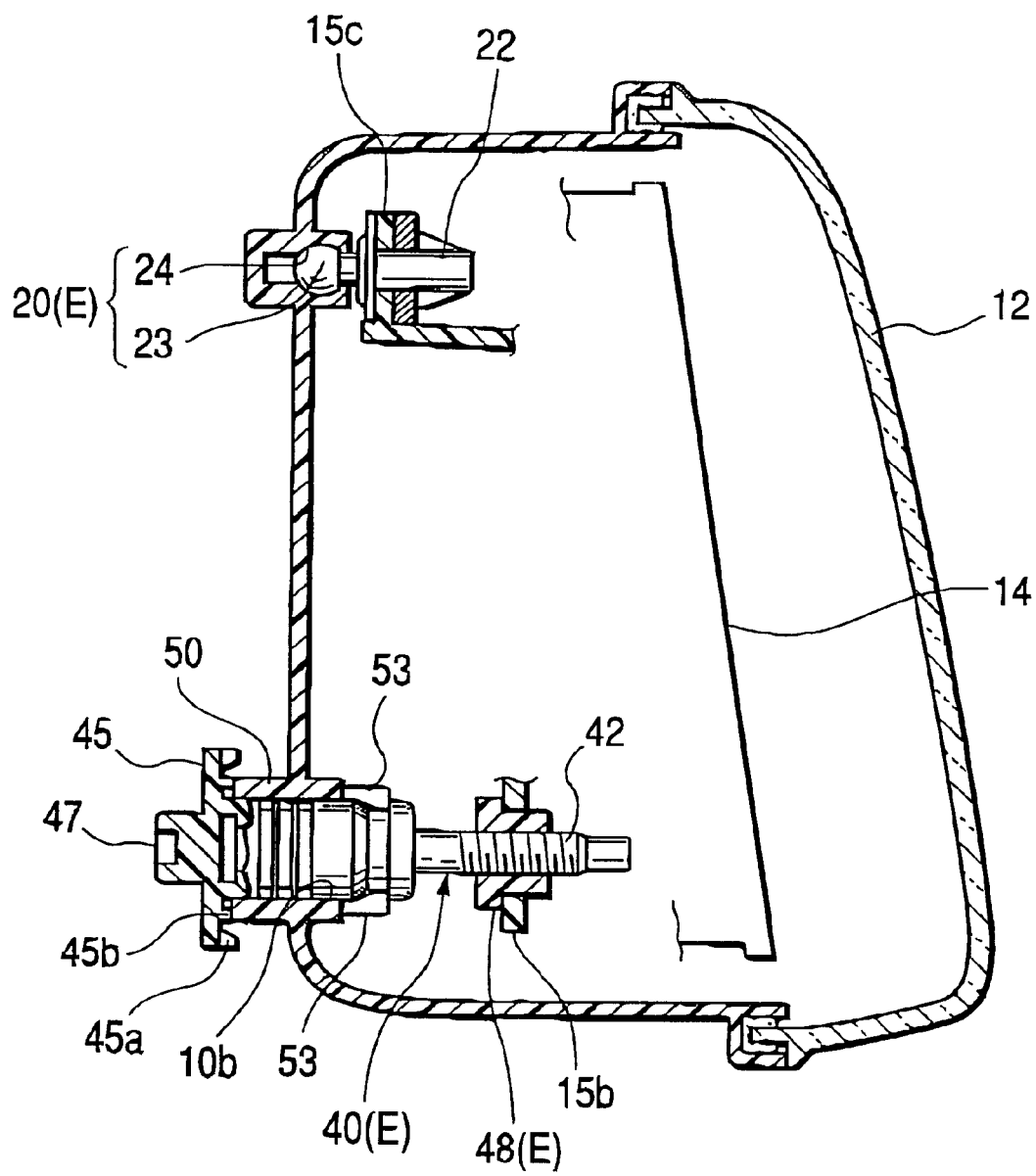
FIG. 3 is a vertical cross section of the head lamp shown in FIG. 1, and is taken along the line III—III.
Figure 4A:
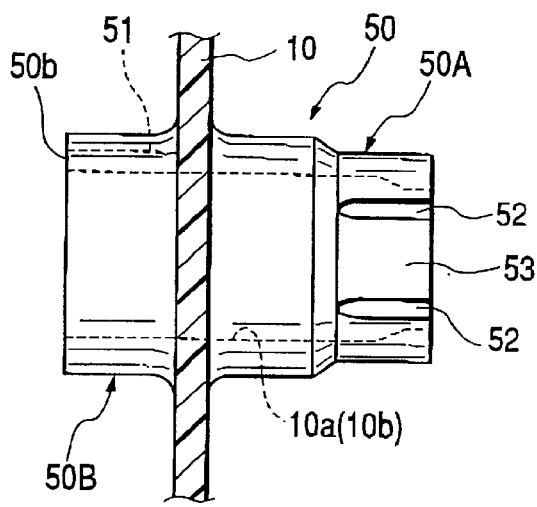
FIG. 4A is an enlarged side view showing a tubular portion for rotatably supporting the aiming screw.
Figure 4B:
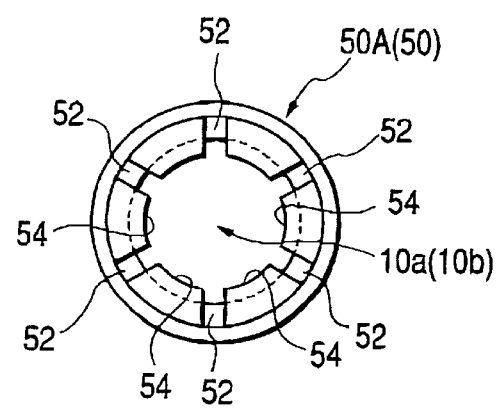
FIG. 4B is an enlarged front view of the tubular portion shown in FIG. 4A.
Figure 4C:
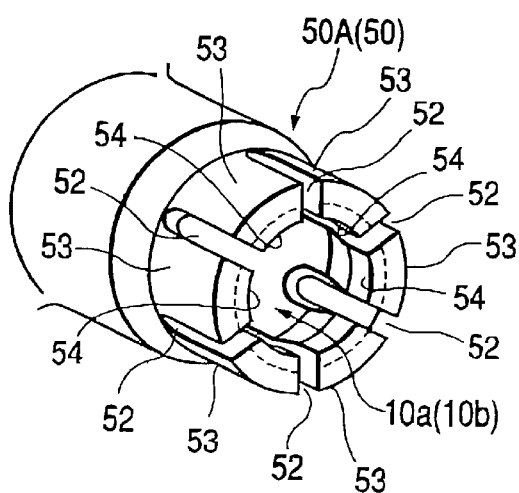
FIG. 4C is an enlarged perspective view of the tubular portion shown in FIG. 4A.
Figure 4D:
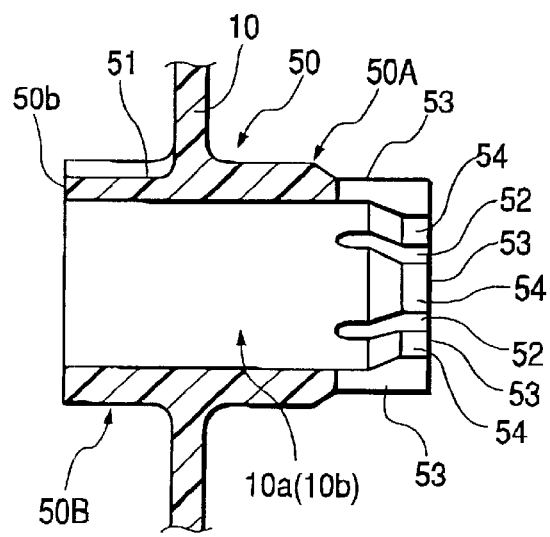
FIG. 4D is an enlarged vertical cross sectional view of the tubular portion shown in FIG. 4A.
Figure 5:
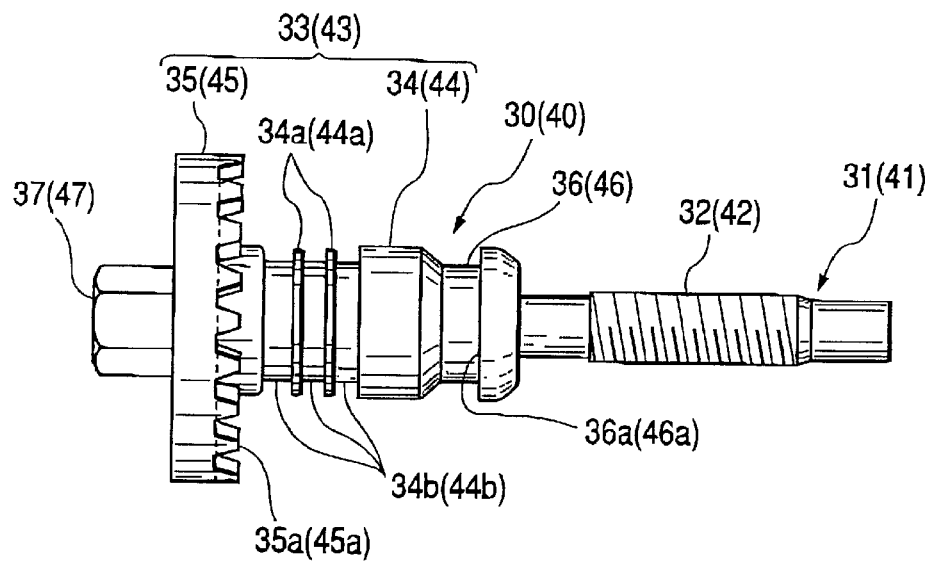
FIG. 5 is an enlarged side view of an aiming screw.
Figure 6:
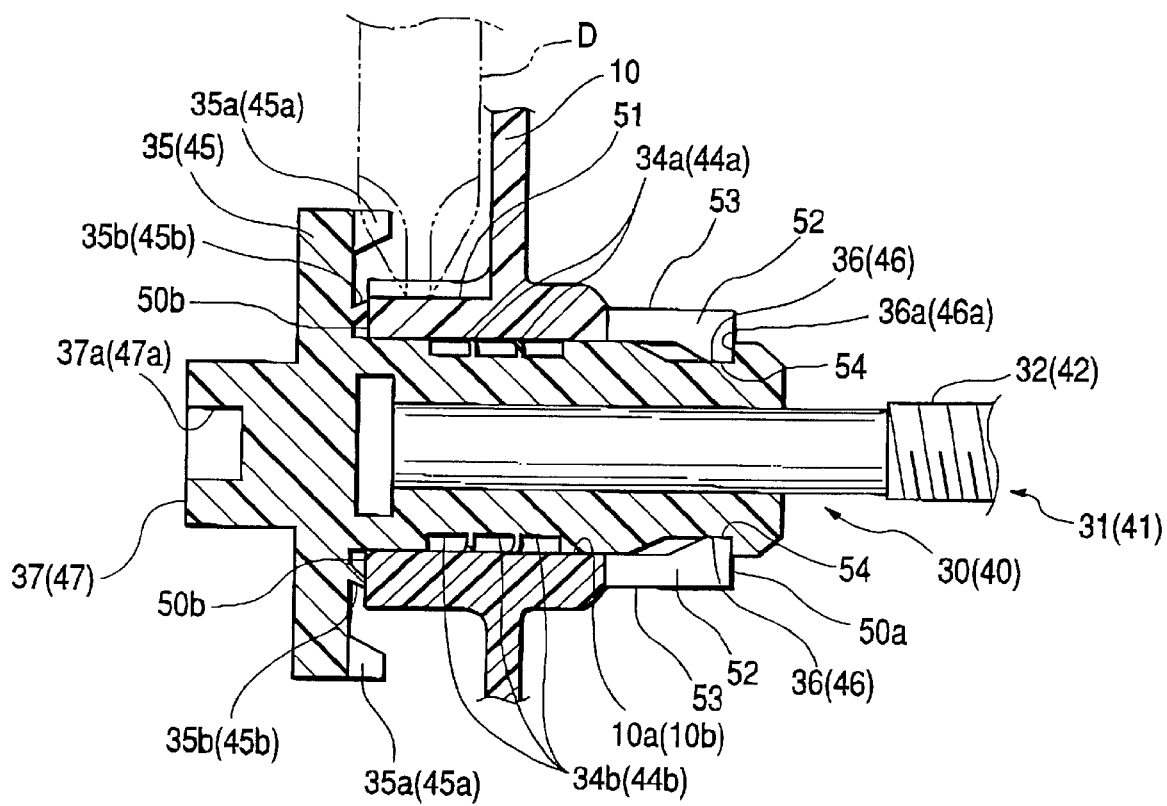
FIG. 6 is an enlarged vertical cross sectional view showing an aiming screw engaged with a tubular portion.

FIG. 1 to FIG. 6 show the first embodiment. FIG. 1 is a front view of the head lamp for an automotive vehicle with a movable reflector. FIG. 2 is a horizontal cross sectional view of the same head lamp (taken along the line II—II in FIG. 1), whereas FIG. 3 is a vertical cross sectional view of the same head lamp (taken along the line III—III in FIG. 1). FIG. 4 shows a tubular portion which rotationally supports the aiming screw, wherein FIG. 4A is an enlarged side view of the tubular portion, FIG. 4B is an enlarged front view of the tubular portion, FIG. 4C is an enlarged perspective view of the tubular potion, and FIG. 4D is an enlarged vertical cross section of the tubular portion. Lastly, FIG. 5 is an enlarged side view of the aiming screw, and FIG. 6 is an enlarged vertical cross section of an aiming screw engaged with a tubular portion.

In these figures, the reference numeral 10 denotes a lamp body in the shape of a container formed of polypropylene resin. A front lens 12 is assembled to the front opening of the lamp body 10 to define a lamp chamber. In the lamp chamber is disposed a reflector 14, having a bulb 18 as a light source mounted integrally thereon. Further, an aiming mechanism E is provided so as to be able to tilt the reflector 14.

The aiming mechanism E includes a ball joint 20, a pair of aiming screws 30,40, and a pair of nut members 38,48. The ball joint 20 is interposed between the lamp body 10 and the reflector 14 to form a fixed fulcrum for tilting movement. The pair of aiming screws 30,40 are rotatably supported in respective screw inserting holes 10a and 10b formed on the lamp body 10. The nut members 38,48 are mounted on the brackets 15a, 15b which project from the back side of the reflector 14, and respectively engage with the threaded portions 32, 42 of the aiming screws 30, 40 to form moving fulcrums of tilting movement. The reference numeral 22 denotes a ball member mounted to a bracket 15c which projects from the back surface of the reflector 14. The ball joint 20 is formed in such a manner that a ball portion 23 of the ball member 22 is rotatably supported in a ball supporting portion 24 formed integrally with the lamp body 10.

By rotating the aiming screw 30, the nut member 38 moves forward and backward along the threaded portion 32 of the aiming screw and the reflector 14 tilts about the axis of tilting movement Ly extending between the ball joint 20 and the nut member 48. By rotating the aiming screw 40, the nut member 48 moves forward and backward along the threaded portion 42 of the aiming screw, and the reflector 14 tilts about the axis of tilting movement Lx extending between the ball joint 20 and the nut member 38. In other words, the aiming screw 30 constitutes a right-and-left aiming screw for adjusting the optical axis of the lamp by tilting about the axis of tilting movement Ly. Similarly, the aiming screw 40 constitutes an upper-and-lower aiming screw for adjusting the optical axis of the lamp by tilting about the axis of tilting movement Lx.

As shown in FIG. 4, the screw insertion holes 10a and 10b are formed by a tubular portion 50 formed integrally with, and extending forward and backward from, the lamp body 10. The part of tubular portion 50 which extends forward from the lamp body 10 forms a forward extension 50A, whereas the part which extends backward from the lamp body 10 forms a backward extension 50B. The end of the forward extension 50A is provided with slits 52 at regular intervals at six positions along the periphery thereof. The slits 52 divide the forward extension 50A into swinging strips 53 (also called divided side walls 53) which are positioned between the adjacent slits 52—that is, six divided side walls 53—and which can swing in the radial direction. Further, the inner side of the tip of each divided side wall 53 is provided with a hooking portion 54 projecting radially inwardly.

The backward extension 50B, as shown in FIG. 6, is formed with such a length that it can accommodate the tip portion of a driver D which is used to rotate the aiming screw 30,40 disposed on the lamp body 10. On the upper surface of the backward extension 50B, to which the tip portion of the driver D abuts, there is formed a flat surface 51 so that the tip of the driver D does not slip along the outer periphery of the tubular portion 50 as the driver rotates.

On the other hand, the aiming screw 30 (40) includes, as shown in FIGS. 5 and 6, a front end portion and a back end portion 33 (43). The front end portion includes a metallic screw body 31 (41) formed with a male screw portion 32 (42), whereas the back end portion 33 (43) is formed of polyacetal. The front end portion and back end portion 33 (43) are integrated together.

The reference numeral 34 (44) denotes a section of the back end portion 33(43) of aiming screw 30 (40) that is rotatably supported by the tubular portion 50, in other words, a rotatably supported portion. The back end portion 33(43) is also integrally formed with a cap gear portion 35 (45) which abuts against the end surface 50b of the backward extension of the tubular portion 50. Further, the front end of the rotatably supported portion 34 (44), around the periphery thereof, is provided with an engaging groove 36 (46), and with a shoulder 36a(46a), as a recessed engaging portion that engages with the hooking portion 54 of the forward extension 50A. When an inside facing surface of the gear portion 35 abuts against the rear end surface 50b, and the shoulder portion 36a (46a) engages with the front end surface 50a, the aiming screw 30 (40) is axially registered and fixed with respect to the screw insertion hole 10a (10b).

The cap gear portion 35 (45) includes teeth 35a (45a) formed on its front side (the side facing the lamp body 10). When the tip portion of the driver D is used to rotate the aiming screw 30 (40) it is brought into contact with the flat surface 51 of the tubular portion 50, and the teeth of the driver D engage with the teeth 35a (45a) of the cap gear portion 35 (45), so that the rotational force of the driver D is transmitted to the cap gear portion 35 (45).

On the back end portion of the aiming screw 30 (40)—behind the cap gear portion 35 (45)—there is integrally provided a rotational operation portion 37 (47) having a hexagonal profile in cross section and having a chamfer 37a (47a) on the end face. The configuration of the rotational operation portion 37(47) allows the aiming screw 30 (40) to be rotated by a tool such as a spanner instead of the driver D.

Near the base of the cap gear portion 35 (45), there is provided a first resilient watertight rib 35b (45b) in the shape of a skirt that comes into sliding contact with the rear end surface 50b of the tubular portion 50. The first resilient watertight rib 35b (45b) is held in pressurized contact with the rear end surface 50b, so as to ensure watertightness at the rotatably supported portion of the aiming screw 30 (40).

The force applied by pressurized contact with the first resilient watertight rib 35b (45b) resiliently supports the aiming screw 30 (40) in the axial direction, so that no rattling of the aiming screw 30 (40) occurs.

Because the first resilient watertight rib 35b (45b), formed of synthetic resin, has a moderate resiliency and flexibility, and because the rear end surface 50b of the tubular portion formed of synthetic resin is a flat surface, the contact between the first watertight rib 35b (45b) and the rear end surface of the tubular portion 50b does not interfere with the rotation of the aiming screw 30 (40).

The rotatably supported portion 34 (44) of the aiming screw is provided with a pair of ring shaped second resilient watertight ribs 34a (44a) that comes into sliding contact with the inner peripheral surface of the tubular portion 50 of screw insertion hole 10a (10b). The outer diameter of the second watertight ribs 34a (44a) is formed a little bit larger than the inner diameter of the screw insertion hole 10a (10b), so that the tip portions of the second watertight ribs 34a (44a) always come into pressurized contact with the inner peripheral surface of the screw insertion hole 10a.

Because an annular groove 34b(44b) is formed extending along both sides of the resilient watertight ribs 34a (44a), on the outer peripheral surface of the rotatably supported portion 34 (44), the flexibility of the resilient watertight ribs 34a (44a) is increased by increasing their radial length without broadening the clearance between the rotatably supported portion 34 (44) of the aiming screw and the screw insertion hole 10a (10b). Therefore, a moderate pressurized contact force acts between the resilient watertight ribs 34a (44a) and the inner surface of the screw insertion hole 10a (10b).

In other words, if there was no annular groove 34b (44b), the amount of projection of the resilient watertight rib—ie., its radial height—is small and, thus, the flexibility is not sufficient. In such a case, an excessive pressurized contact force is applied between the resilient watertight rib and the inner peripheral surface of the screw insertion hole, thereby causing a large rotational torque which may prevent the smooth rotation of the aiming screw, or which may prevent the smooth insertion of the aiming screw into the screw insertion hole. In order to lower the rotational torque, one may attempt to broaden a clearance between the rotatably supported portion 34 (44) and the screw insertion hole 10a (10b) to increase the amount of projection of the watertight rib and, thereby, increase its flexibility. But it is not preferable to increase such clearance because doing so undesirably reduces the watertightness, and undesirably increases rattle at the rotatably supported portion.

Therefore, in the present embodiment, an annular groove 34b (44b) is formed along the base of the watertight ribs 34a (44a) in order to increase the radial length of the resilient watertight ribs 34a (44a) without broadening a clearance between the rotatably supported portion 34 (44) and the inner peripheral surface of the screw insertion hole 10a (10b). In other words, the present invention achieves a sufficient flexibility of the ribs 34a(44a) without lowering watertightness, and does so in such a manner that a pressurized contact force—or frictional resistance to sliding movement—generated between the resilient watertight ribs 34a (44a) and the inner peripheral surface of the screw insertion hole 10a is lowered. Therefore, the present invention achieves both a smooth rotation of the aiming screw 30 (40), and a smooth insertion of the aiming screw 30 (40) into the screw insertion hole 10a (10b).

The watertight ribs 34a (44a) are axially spaced from one another so as to provide two annular sliding contact portions between the rotatably supported portion 34 (44) and the inner peripheral surface of the screw insertion hole 10a (10b), thereby enhancing watertightness of the aiming screw 30 (40).

Assembly of the aiming screws 30, 40 to the lamp body's tubular portions 50—having screw insertion holes 10a, 10b therein—will now be described.

First, the aiming screw 30 (40) is inserted from the back side of the lamp body 10 into the screw insertion hole 10a (10b). The male screw portion 32 (42) has an inner diameter smaller than that of the screw insertion hole 10a (10b) and, therefore, is smoothly inserted into the screw insertion hole 10a (10b). The front end portion of the rotatably supported portion 34 (44) is a little smaller in diameter than is the screw insertion hole 10a (10b), and when it comes into contact with the hooking portion 54 formed on the divided swinging strips 53, it resiliently deforms the divided swinging strips 53 by pressing them in such a manner that they open radially outwardly, whereby the rotatably supported portion 34 (44) moves forward. Then, the hooking portion 54 of the divided swinging strips 53 engages with the engaging groove 36 (46). Further, the resilient watertight rib 35b (45b), formed on the rear end of the rotatably supported portion 34 (44), abuts—in pressurized contact—against the rear end surface 50b of the tubular portion. In the above manner, the aiming screw 30 (40) is registered and fixed with respect to the screw insertion hole 10a (10b).

Figure 7:
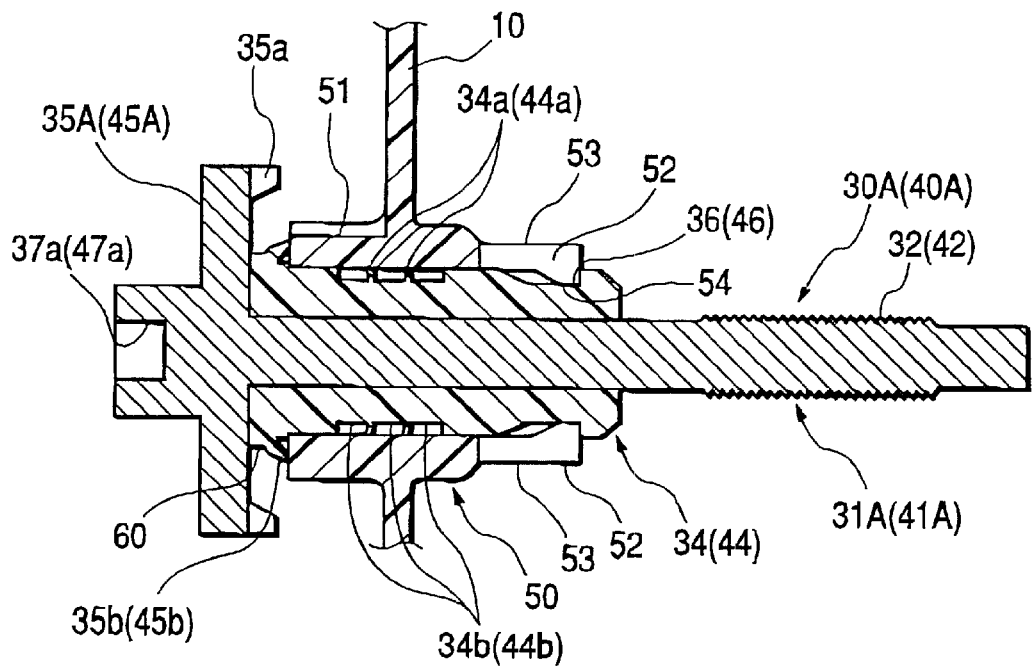
FIG. 7 is an enlarged vertical cross sectional view showing an aiming screw, according to a second embodiment of the present invention, engaged with a tubular portion.

FIG. 7 shows a second embodiment of the present invention, and is an enlarged vertical cross section of an aiming screw 30A(40A) engaged with a tubular portion 50.

The aiming screw 30A (40A) includes an integrated cap-gear-screw body 31A (41A) formed of metal. The cap-gear-screw body 31A(41A) has a cap gear portion 35A (45A) at the rear end and a male screw thread 32(42) at the front end thereof. A rotatably supported portion 34 (44) is formed of synthetic resin, in a single unit, by insert molding. The rotatably supported portion 34(44) is connected to the outer surface of the cap-gearscrew body 31A(41A). The outer peripheral surface of the shaft portion of the cap-gear-screw body 31A (41A) is provided with serrations in the form of vertical grooves to increase the junction strength at the interface between the resin of the rotatably supported portion 34(44) and the metal of the cap-gear-screw body 31A(41A).

A flange portion 60 is provided on the rotatably supported portion 34 (44) so as to oppose the rear end surface 50b of the tubular portion 50. Further, a watertight rib 35b (45b) is provided on the front surface side of the flange portion 60 so that the rib 35b(45b) contacts the rear end surface 50b.

Since other components are identical to those of the first embodiment, identical numbers are used to designate like parts, and the description thereof is omitted.

Figure 8:
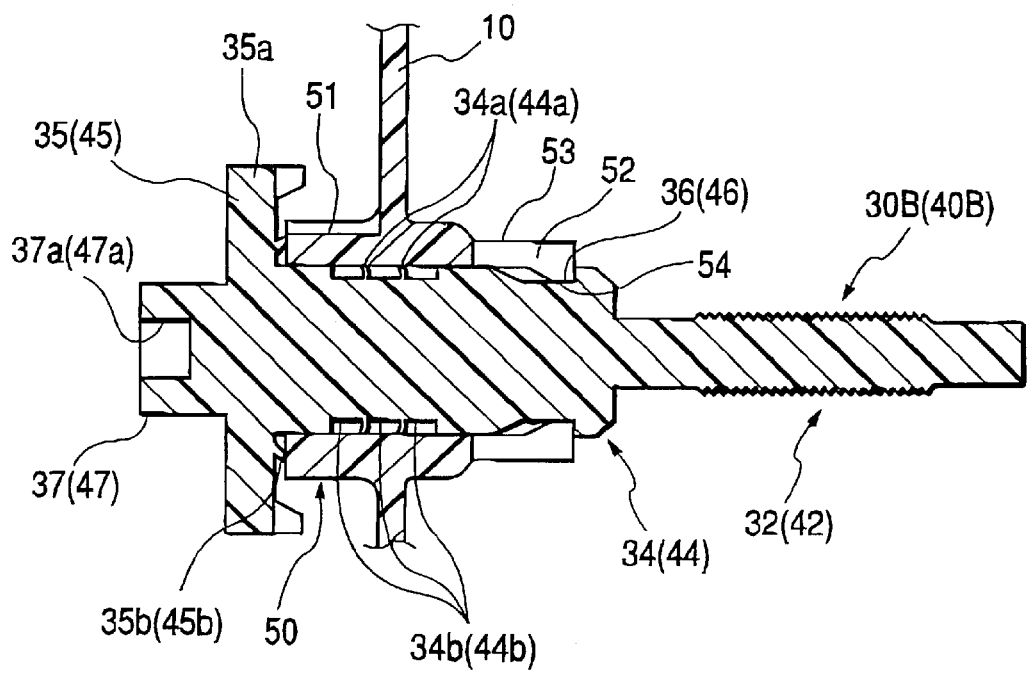
FIG. 8 is an enlarged vertical cross section showing an aiming screw, according to a third embodiment of the present invention, engaged with a tubular portion.

FIG. 8 shows a third embodiment of the present invention, and is an enlarged vertical cross section of the aiming screw 30B(40B) and the tubular portion 50.

The entire aiming screw 30B (40B)—including male screw portion 32 (42), rotatably supported portion 34 (44), and the cap gear portion 35 (45)—is formed of synthetic resin as a single unit. That is, the aiming screw 30B(40B) is a monolith. Since other components are identical to those of the first embodiment, identical numbers are used to designate like parts, and the description thereof is omitted.

Figure 9:
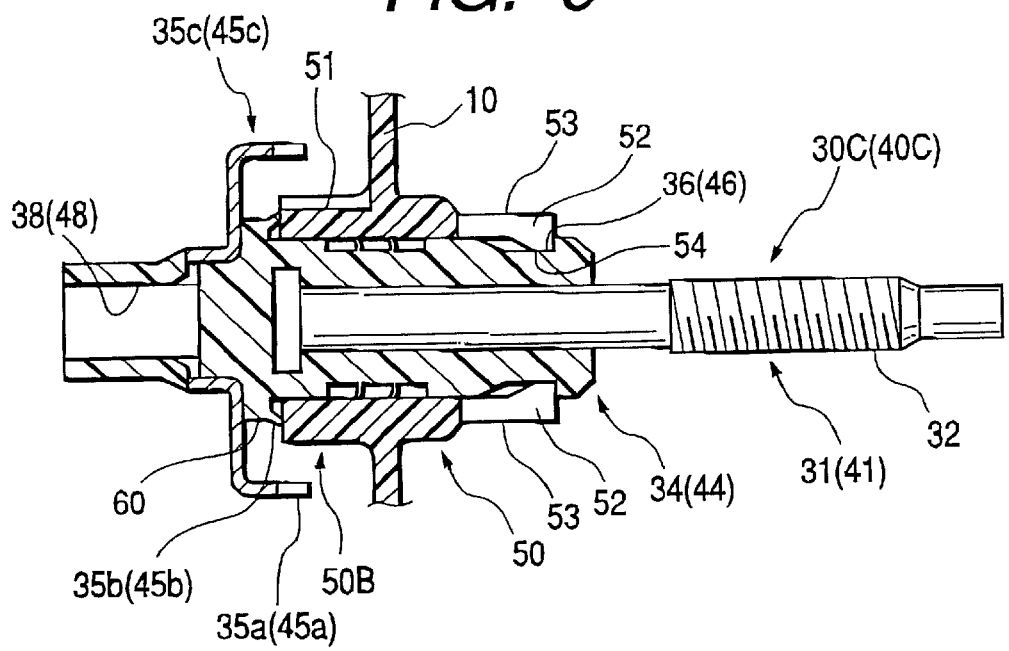
FIG. 9 is an enlarged vertical cross sectional view showing an aiming screw, according to a fourth embodiment of the present invention, engaged with a tubular portion.
Figure 10:
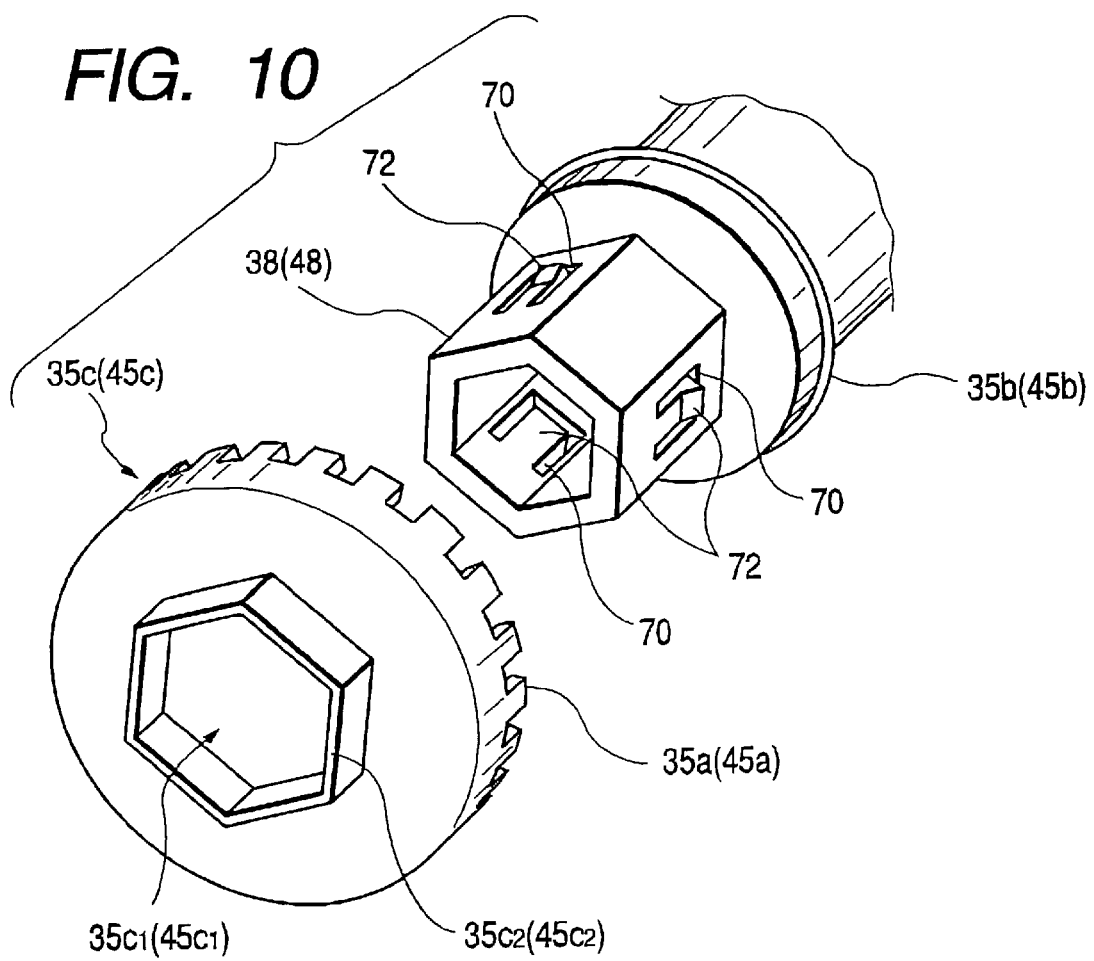
FIG. 10 is an enlarged exploded perspective view showing a cap gear portion of the aiming screw according to the fourth embodiment of the present invention.

FIG. 9 shows a fourth embodiment of the present invention, and is an enlarged vertical cross section of the aiming screw 30C(40C) and the tubular portion (50). FIG. 10 is an enlarged exploded perspective view of the cap gear portion of the aiming screw according to the fourth embodiment of the invention.

The aiming screw 30C (40C) is constructed in such a manner that a metallic annular gear member 35c (45c) is mounted to a gear mounting portion 38 (48). The gear mounting portion 38 (48) which projects from and is integrally formed of synthetic resin together with the rear end portion of the rotatably supported portion 34 (44). The metallic annular gear member 35c(45c) is attached to the rear end portion of the rotatably supported portion 34(44) by a peg-and-recess engagement.

The gear mounting portion 38 (48) is formed in the shape of a hollow hexagonal prism, and includes a resilient hook 72. The resilient hook 72 is surrounded by U-shaped slit 70 and, thus, provides a peg-andrecess type of engagement mechanism. The annular gear member 35c (45c) is then fitted to the gear mounting portion 38 (48) so that the gear mounting portion 38 (48) is engaged within an engaging hole $35c_1$, ($45c_1$) of the annular gear member 35c (45c), and so that a peripheral frame $35c_2$ ($45c_2$) of the engaging hole is engaged with the resilient hook 72 thereby attaching the annular gear member 35c(45c) to the gear mounting portion 38(48).

Because other components are identical to those of the second embodiment, identical numbers are used to designate like parts, and the description thereof is omitted.

Figure 11:
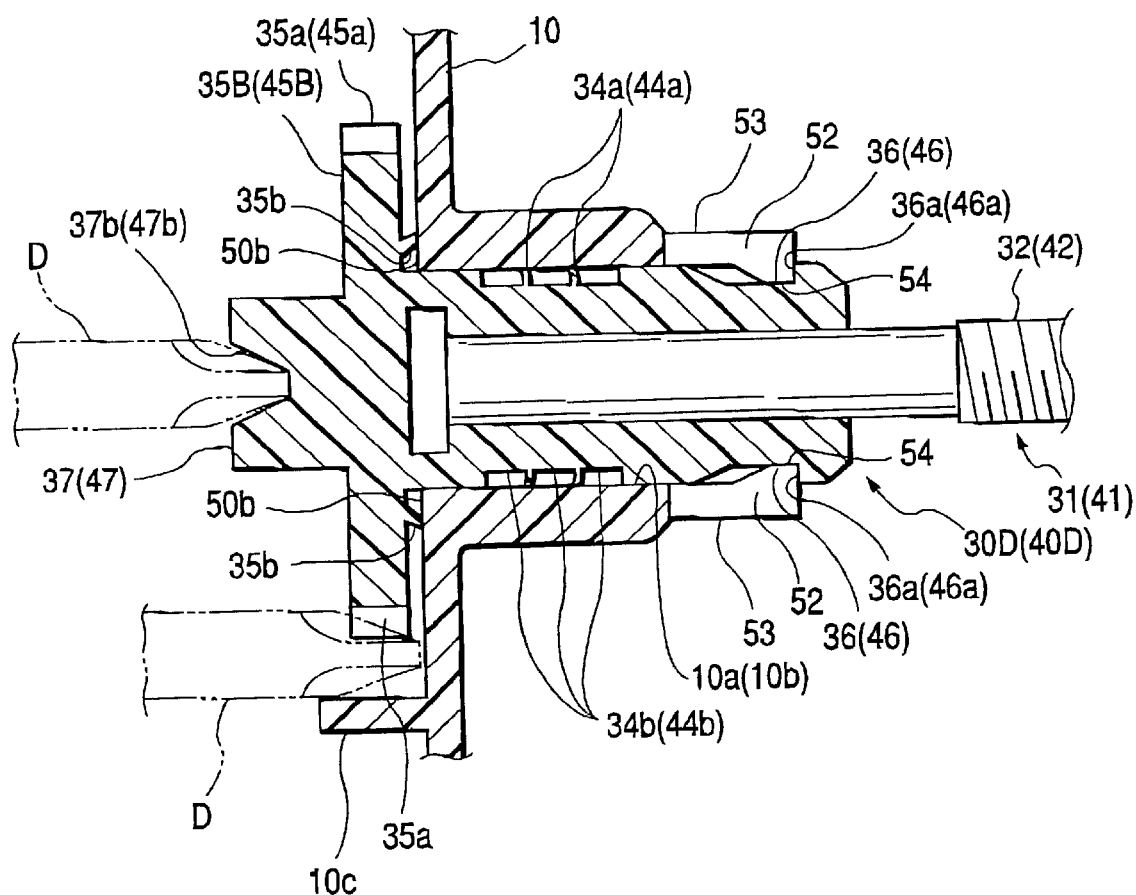
FIG. 11 is an enlarged vertical cross section showing an aiming screw, according to a fifth embodiment of the present invention, engaged with a tubular portion.
Figure 12:
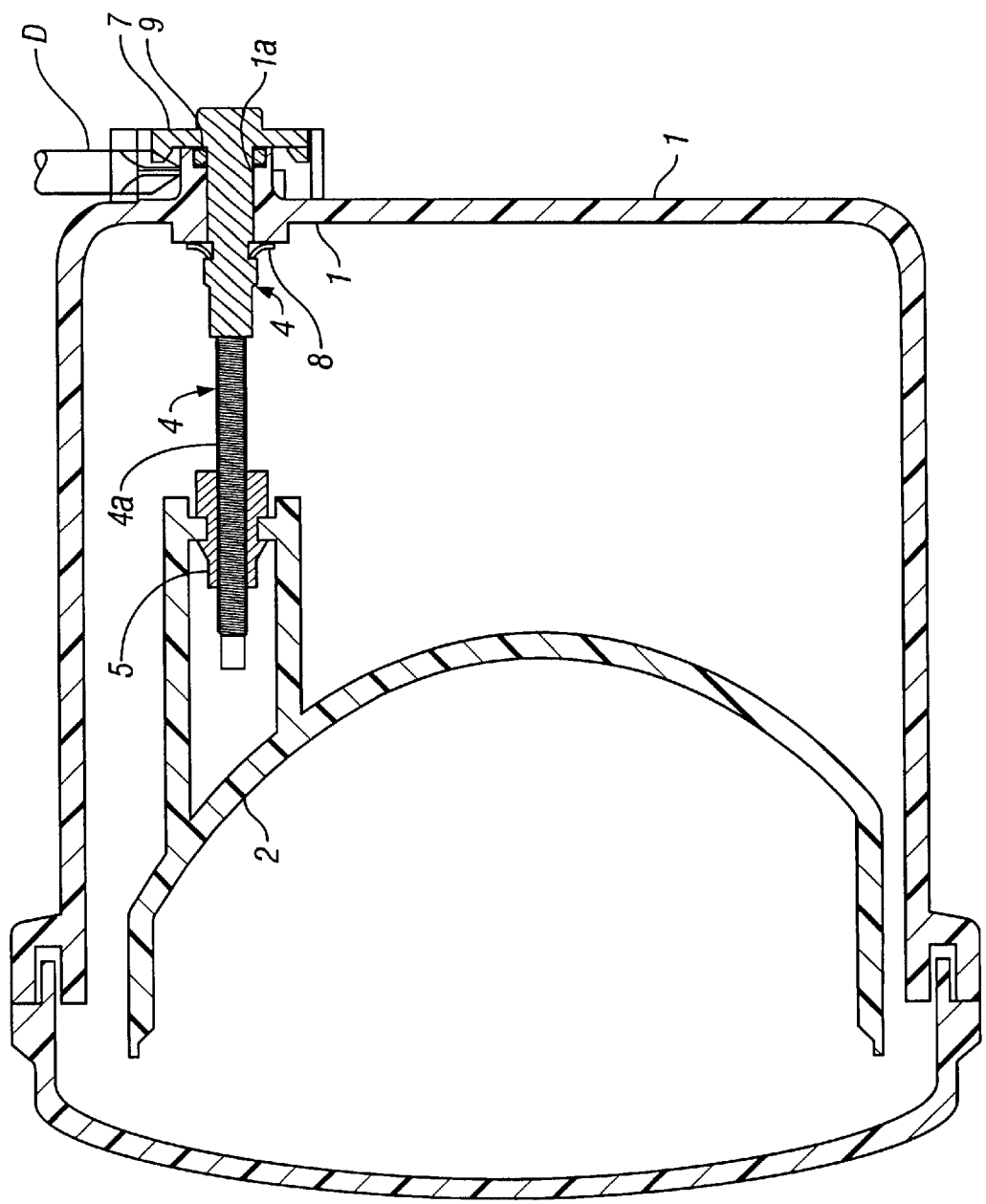
FIG. 12 is a cross sectional view showing an aiming screw, according to the related art, engaged in a screw insertion hole.

A fifth embodiment of the present invention will now be described with reference to FIG. 11.

Although a cap gear portion was integrated with the rear end portion of the aiming screw in the above-described first embodiment, it is also possible integrally to provide a spur gear portion 35B (45B) on the rear end portion of the aiming screw 30D (40D).

In this fifth embodiment, the rotational operation portion 37 (47) on the rear end portion of the aiming screw is provided with an engaging groove 37b (47b) with which the teeth of the driver D engage, so that the aiming screw 30D (40D) may be rotated with the driver D. Alternatively, the driver D may be engaged with teeth 35a (45a) of the spur gear portion 35B (45B). The reference numeral 10c is an extension for supporting the driver D when rotationally operating the aiming screw.

In the above-described embodiments the lamp body 10 was formed of polypropylene resin, and the resin portions of the aiming screws—such as the rotatably supported portion—were formed of polyacetal resin having a moderate resilience, good wear resistance, and good sliding properties upon contact with the polypropylene. However, the resin portions of the aiming screws may be formed of nylon resin instead of polyacetal resin.

As clearly can be understood from the above description, a head lamp for an automotive vehicle with a movable reflector according to a first aspect of the present invention includes an aiming screw which is resiliently supported by a rotatably supported portion without rattle in the forward and backward directions. Further, watertightness at the rotatably supported portion of the aiming screw is established by using a skirt shaped resilient watertight rib unitarily formed on the aiming screw, wherein the rib is in pressurized contact and sliding contact with the peripheral portions of the screw insertion hole. Due to the above-described construction, it is not necessary to interpose a resilient member such as a push-on-fixture, or to utilize a sealing member such as an O-ring, at the rotationally supported portion of the aiming screw. Thus, the present invention decreases the number of components constituting the aiming mechanism, simplifies the structure of the aiming mechanism, and facilitates assembly of the aiming mechanism.

The watertight rib of the present invention—because it is formed of synthetic resin—does not experience deterioration caused by water even with long-term use, thereby ensuring a long-lasting resilient support and watertightness at the rotatably supported portion of the aiming screw.

According to the second aspect of the present invention, the aiming screw is supported without rattle and is provided with watertightness at the rotatably supported portion by watertight ribs which are large in radial length. Thus, the aiming mechanism can be used for a long time.

Because the tip portion of the driver, for rotating the aiming screw, is carried on a backward extension of the tubular portion, the aiming screw can be rotated smoothly and stably, thereby facilitating adjustment.

According to the third aspect of the present invention, a rotatably supported portion of the aiming screw is provided with resilient watertight ribs at two positions. A resilient watertight rib, formed on an inner peripheral edge of the gear portion, engages a rear end face of the tubular portion of the screw insertion hole, and second watertight ribs formed on the peripheral edge of the rotatably supported portion engage an inner periphery of the screw insertion hole. Due to this configuration of ribs, watertightness at the rotatably supported portion of the aiming screw is ensured.

It is contemplated that numerous modifications may be made to the headlamp for an automotive vehicle having a movable reflector of the present invention without departing from the spirit and scope of the invention as defined in the following claims.

What is claimed is:

1. A head lamp for an automotive vehicle with a movable reflector comprising:

a container-shaped lamp body having a screw insertion hole, wherein said screw insertion hole includes a tubular portion formed integrally with the lamp body, wherein said tubular portion passes through and extends forward of the lamp body, and further wherein said tubular portion is constructed in such a manner that the portion extending forward is divided into a plurality of swinging strips each of which is resiliently deformable in the radial direction of the tubular portion, each of said swinging strips including a hooking portion formed on a forward portion thereof;

a reflector with a light source mounted thereon; and an aiming mechanism interposed between said lamp body and said reflector for supporting said reflector so that said reflector is tiltable with respect to the lamp body, said aiming mechanism including an aiming screw rotatably supported in said screw insertion hole, said aiming screw including a recessed engaging portion, said recessed engaging portion being engaged with said hooking portions of said swinging strips to thereby retain the aiming screw in the screw insertion hole, wherein said reflector is tilted by rotation of the aiming screw, wherein said aiming screw further comprises:
a rotatably supported portion supported by said screw insertion hole, said rotatably supported portion including a forward portion and a rearward portion, wherein said rotatably supported portion is formed of synthetic resin,
a male screw portion formed on the forward portion of said rotatably supported portion,
a gear portion, formed on said rearward portion of said rotatably supported portion, to which a rotational operating power is transmitted,
wherein said rotatably supported portion, said male screw portion, and said gear portion are integrally connected with each other, and
a first resilient rib in pressurized-contact, and sliding-contact, with the periphery of said screw insertion hole.

2. A head lamp for an automotive vehicle with a movable reflector as set forth in claim 1, wherein:
said tubular portion penetrates the lamp body in the forward and backward directions, and extends from the lamp body in the forward and backward directions;
said gear portion is composed of a cap gear having teeth at a front portion thereof; and
said first watertight rib comes into pressurized-contact, and sliding contact, with the backward extension of said tubular portion.

3. A head lamp for an automotive vehicle with a movable reflector as set forth in claim 1, further comprising a second resilient watertight rib having a ring shape, said second resilient watertight rib being formed integrally with said rotatably supported portion of the aiming screw so as to be in sliding contact with the inner surface of said screw insertion hole.

4. A head lamp for an automotive vehicle with a movable reflector as set forth in claim 1, wherein a portion of said aiming screw, from said rotatably supported portion to the rearward portion including the gear portion, is formed of synthetic resin, and said aiming screw further includes a metallic screw body on which said male screw portion is formed, wherein said rotatably supported portion is integrally molded to said metallic screw body.

5. A head lamp for an automotive vehicle with a movable reflector as set forth in claim 1, wherein said aiming screw further includes a gear integrated screw body of metal, said gear integrated screw body having a rear end and a front end, wherein said gear portion is unitarily formed on said gear-integrated-screw-body rear end, and said male screw portion is unitarily formed on said gear-integrated-screw-body front end, and further wherein said rotatably supported portion of synthetic resin is integrally molded to said gear integrated screw body.

6. A head lamp for an automotive vehicle with a movable reflector as set forth in claim 1, wherein the entire aiming screw, including the male screw portion, the rotatably supported portion, and the gear portion, is monolithically formed of synthetic resin.

7. A head lamp for an automotive vehicle with a movable reflector as set forth in claim 1, wherein said rotatably supported portion includes a gear mounting portion projecting from and integrally formed on said rotatably-supported-portion rearward portion, said gear mounting portion including a peg-in-recess mounting mechanism, and said gear portion is mounted to said gear mounting portion by engaging with said peg-in-recess so as to constitute a single unit.

* * * * *